United States Patent [19]
Pursell, Jr.

[11] Patent Number: 5,497,970
[45] Date of Patent: Mar. 12, 1996

[54] COMPUTER KEYBOARD AND TEMPLATE HOLDER

[76] Inventor: William C. Pursell, Jr., 727 Chesapeake Ave., Hampton, Va. 23661

[21] Appl. No.: 326,247

[22] Filed: Oct. 20, 1994

[51] Int. Cl.$^6$ ............................................. B41J 11/02
[52] U.S. Cl. ................................ 248/442.2; 248/918
[58] Field of Search .......................... 248/441.1, 442.2, 248/447.1, 447.2, 451, 918, 225.31, 229, 231.5, 231.8, 316.1, 316.5, 316.7, 298

[56] References Cited

U.S. PATENT DOCUMENTS

| | | | |
|---|---|---|---|
| 4,546,947 | 10/1985 | Geston | 248/442.2 |
| 4,863,124 | 9/1989 | Ball et al. | 108/28 |
| 4,935,888 | 6/1990 | Heston et al. | 364/708 |
| 5,104,086 | 4/1992 | Ramey, III et al. | 248/442.2 |
| 5,144,303 | 9/1992 | Purcell | 341/23 |
| 5,192,150 | 3/1993 | Rüggeberg | 400/477 |
| 5,341,929 | 8/1994 | Stefancin, Jr. | 206/320 |

*Primary Examiner*—J. Franklin Foss

[57] ABSTRACT

A computer keyboard and template holder comprising a platform having an upstanding front wall, an upstanding back wall, and a bottom plate interconnecting the front wall with the back wall to define a holding space therebetween and with the bottom plate having a supporting surface located below the holding space sized for allowing a computer keyboard to be placed thereon such that the computer keyboard is juxtaposed between the walls; and a coupling mechanism secured to the back wall of the platform for holding computer templates for ready access and use.

1 Claim, 4 Drawing Sheets

COMPUTER KEYBOARD AND TEMPLATE HOLDER

BACKGROUND OF THE INVENTION

1. Field of the Invention

The present invention relates to a computer keyboard and template holder and more particularly pertains to holding a computer keyboard and associated templates and working papers in a convenient location for use with a computer with a computer keyboard and template holder.

2. Description of the Prior Art

The use of computer keyboard holders is known in the prior art. More specifically, computer keyboard holders heretofore devised and utilized for the purpose of holding a computer keyboard for ready use are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,560,964 to Bedell et al. discloses a keyboard unit. U.S. Pat. No. 4,381,500 to Urata et al. discloses a keyboard apparatus. U.S. Pat. No. 4,935,888 to Heston et al. discloses a computer keyboard template system. U.S. Pat. No. 5,144,303 to Purcell discloses stacked computer keyboard function key multiple template retainers. U.S. Pat. No. 5,192,150 to Ruggeberg discloses a computer keyboard template selector.

While these devices fulfill their respective, particular objective and requirements, the aforementioned patents do not describe a computer keyboard and template holder that holds a computer keyboard, computer templates and working papers in a convenient readily accessible location for use.

In this respect, the computer keyboard and template holder according to the present invention substantially departs from the conventional concepts and designs of the prior art, and in doing so provides an apparatus primarily developed for the purpose of holding a computer keyboard and associated templates and working papers in a convenient location for use with a computer.

Therefore, it can be appreciated that there exists a continuing need for new and improved computer keyboard and template holder which can be used for holding a computer keyboard and associated templates and working papers in a convenient location for use with a computer. In this regard, the present invention substantially fulfills this need.

SUMMARY OF THE INVENTION

In the view of the foregoing disadvantages inherent in the known types of computer keyboard holders now present in the prior art, the present invention provides an improved computer keyboard and template holder. As such, the general purpose of the present invention, which will be described subsequently in greater detail, is to provide a new and improved computer keyboard and template holder and method which has all the advantages of the prior art and none of the disadvantages.

To attain this, the present invention essentially comprises, in combination, a rigid platform having a short upstanding rectangular planar front wall with a top edge and a bottom edge, a long upstanding rectangular planar back wall with a top edge and a bottom edge, and a long generally rectangular bottom plate interconnecting the front wall with the back wall near their bottom edges to define a holding space therebetween and with the bottom plate having an angled supporting surface located below the holding space sized for allowing a computer keyboard to be placed thereon such that the computer keyboard is juxtaposed between the walls. Three spaced parallel axially aligned openable rigid binder rings are included and coupled to the back wall of the platform near the top edge thereof. A plurality of transparent plastic rectangular sleeves are included and coupled to the binder rings. Each sleeve has a top planar surface interconnected with a bottom planar surface to create a space therebetween for holding a computer template. Each sleeve further includes a front long edge, a rear long edge, opposed short side edges interconnecting the long edges, and three spaced aligned holes disposed therethrough near the rear long edge thereof removably mated with the binder rings. Each sleeve additionally has an integral and generally rectangular tab coplanarly projected from one side edge thereof. The sleeves in combination are slidably positionable in a registered superposed relation upon the top edge of the back wall such that their tabs are offset and readily accessible. Lastly, an elongated rigid arm is included and has a lower first end pivotally coupled to one side edge of the platform and an upper second end projected upwards to a location above and offset from the platform and terminated at a openable clamp for removably holding working papers.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved computer keyboard and template holder which has all the advantages of the prior art computer keyboard holders and none of the disadvantages.

It is another object of the present invention to provide a new and improved computer keyboard and template holder which may be easily and efficiently manufactured and marketed.

It is a further object of the present invention to provide a new and improved computer keyboard and template holder which is of durable and reliable construction.

An even further object of the present invention is to provide a new and improved computer keyboard and template holder which is susceptible of a low cost of manufacture with regard to both materials and labor, and which accordingly is then susceptible of low prices of sale to the consuming public, thereby making such a computer keyboard and template holder economically available to the buying public.

Still yet another object of the present invention is to provide a new and improved computer keyboard and template holder which provides in the apparatuses and methods of the prior art some of the advantages thereof, while simultaneously overcoming some of the disadvantages normally associated therewith.

Even still another object of the present invention is to provide a new and improved computer keyboard and template holder for holding a computer keyboard and associated templates and working papers in a convenient location for use with a computer.

Lastly, it is an object of the present invention to provide a new and improved computer keyboard and template holder comprising a platform having an upstanding front wall, an upstanding back wall, and a bottom plate interconnecting the front wall with the back wall to define a holding space therebetween and with the bottom plate having a supporting surface located below the holding space sized for allowing a computer keyboard to be placed thereon such that the computer keyboard is juxtaposed between the walls; and coupling means secured to the back wall of the platform for holding computer templates for ready access and use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
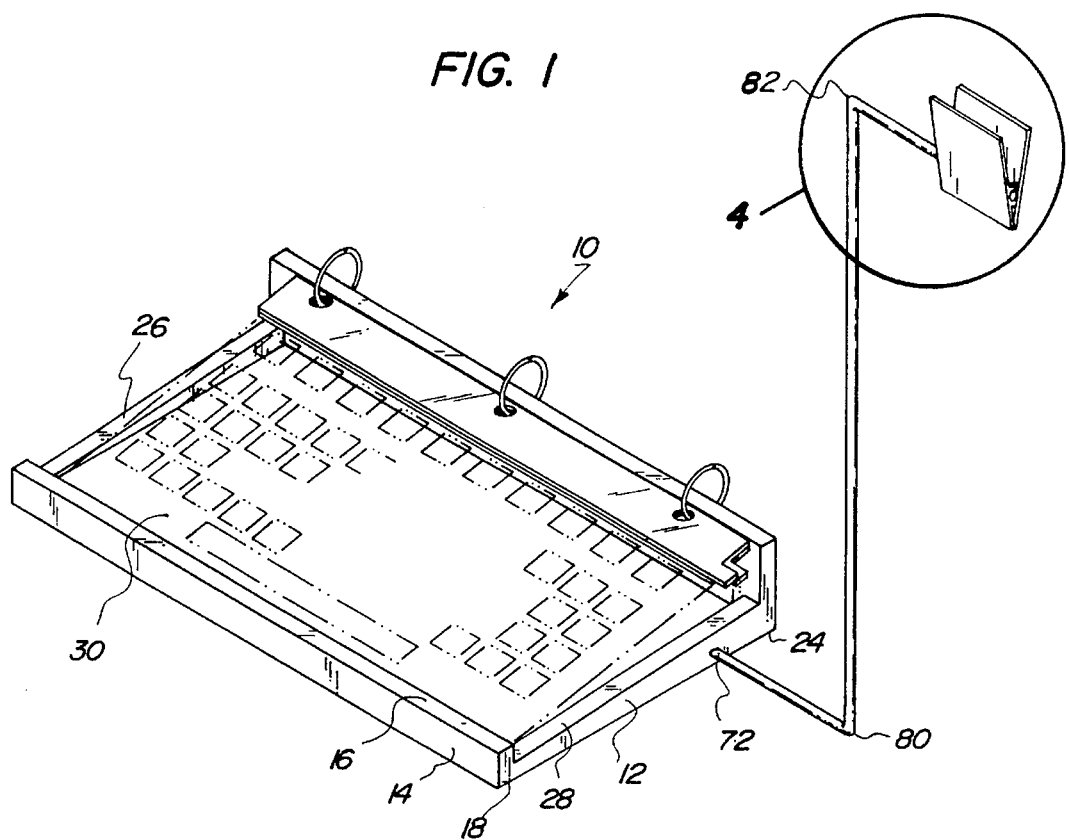
FIG. 1 is a perspective view of the preferred embodiment of the computer keyboard and template holder constructed in accordance with the principles of the present invention.
Figure 2:
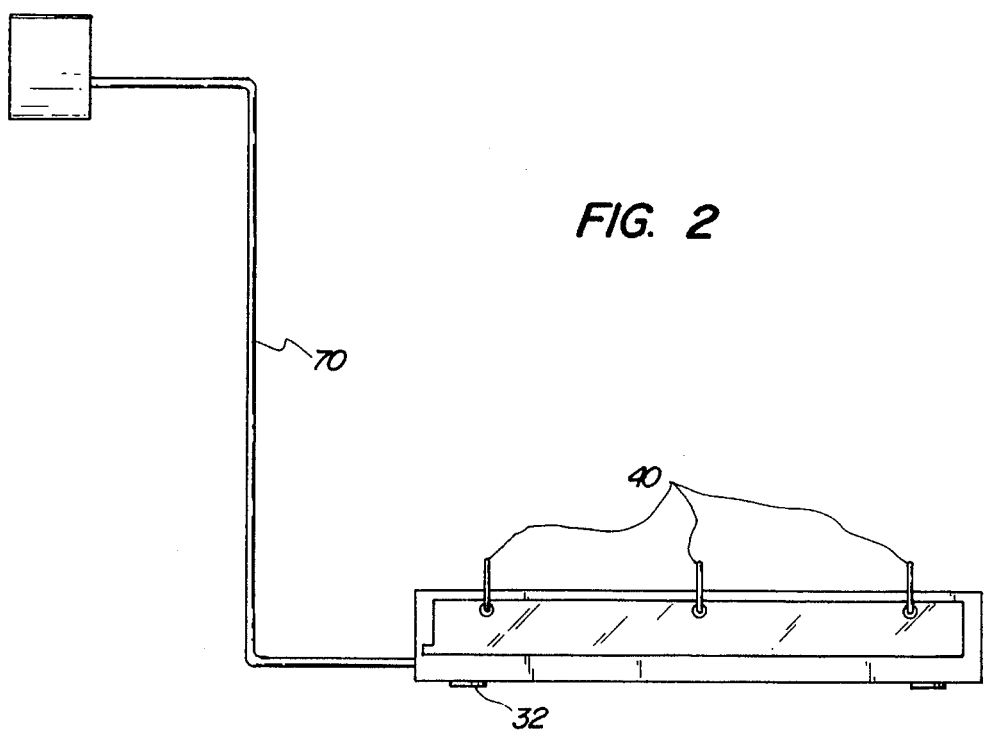
FIG. 2 is a side-elevational view of the preferred embodiment of the present invention.
Figure 4:
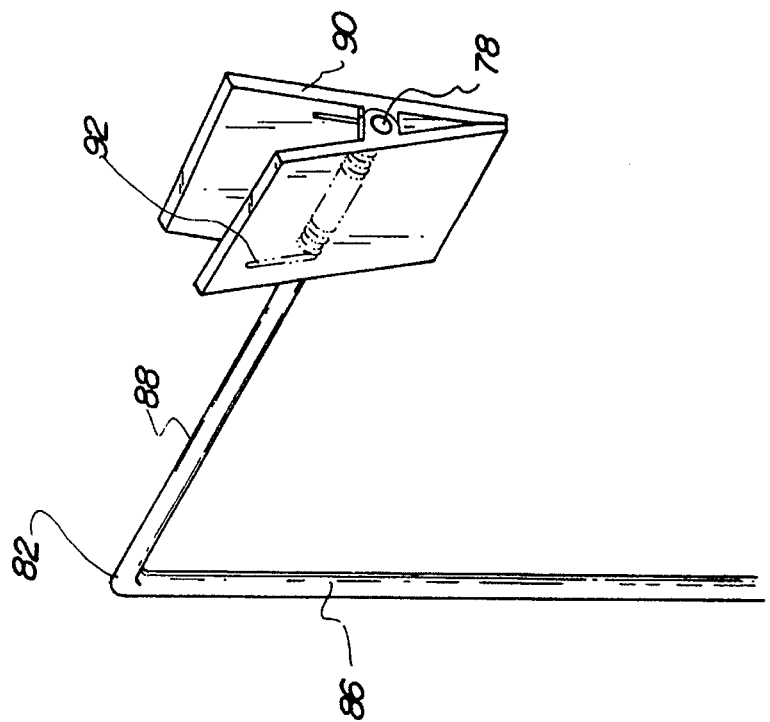
FIG. 4 is an enlarged perspective view of the arm with a clamp coupled thereto for holding papers.
Figure 3:
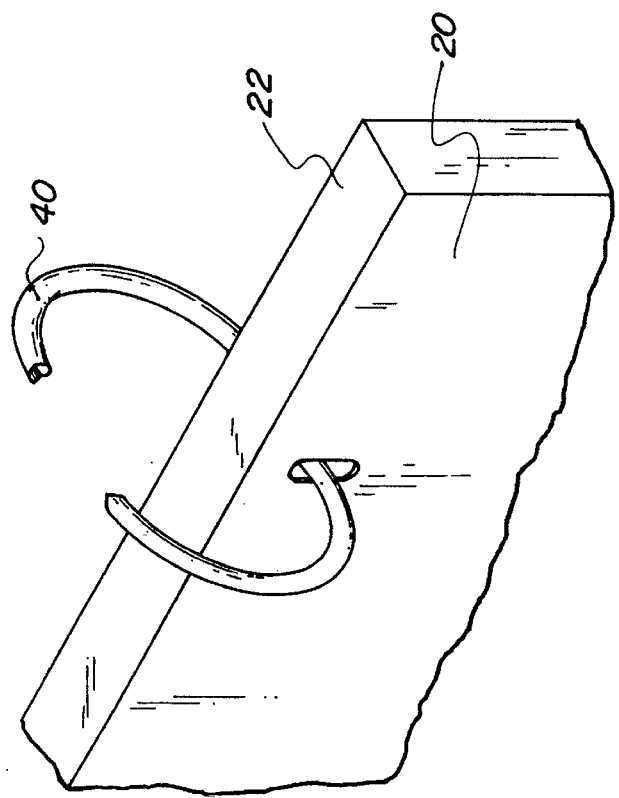
FIG. 3 is an enlarged perspective view of a binder ring and its securement to the rear wall of the platform.
Figure 5:
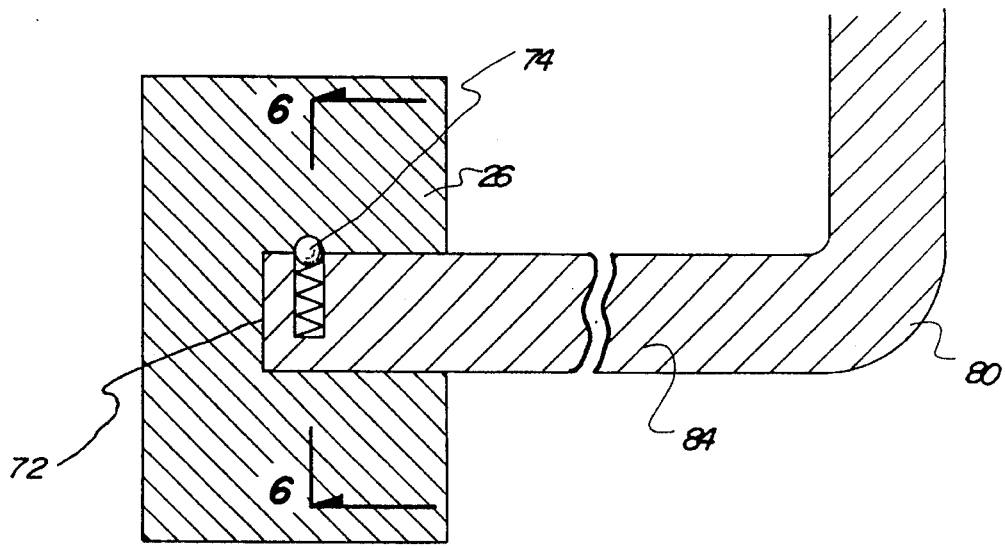
FIG. 5 is a cross-sectional view of the coupling between the platform and the arm.
Figure 6:
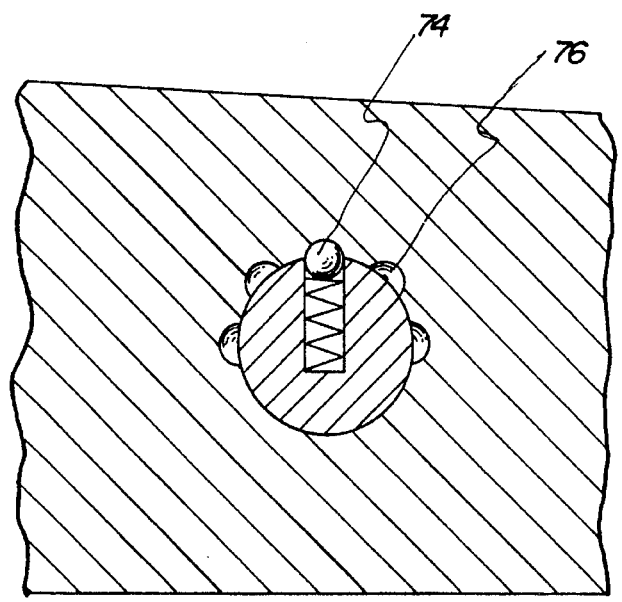
FIG. 6 is a cross-sectional view of the pivotal relation between the arm and platform taken along the line 6—6 of FIG. 5.
Figure 7:
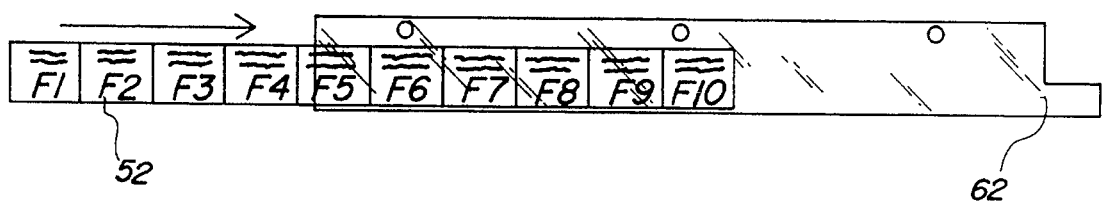
FIG. 7 is a plan view of a sleeve with a computer template being disposed therein for use.
Figure 8:
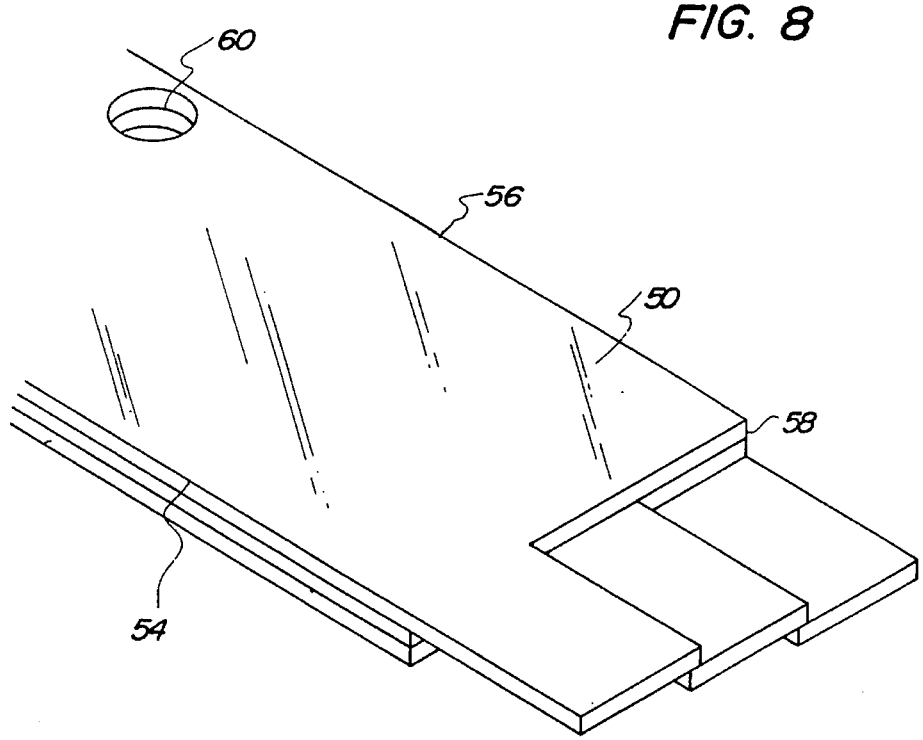
FIG. 8 is an enlarged perspective view of a stacked sequence of sleeves with tabs projected outwards therefrom for ready access.

With reference now to the drawings, and in particular, to FIG. 1 thereof, the preferred embodiment of the new and improved computer keyboard and template holder embodying the principles and concepts of the present invention and generally designated by the reference number 10 will be described.

The present invention is comprised of a plurality of components. In their broadest context, such components include a platform, binder rings, sleeves and an arm. Such components are individually configured and correlated with respect to each other to provide the intended function of holding a computer keyboard, associated templates and working papers in a convenient location for ready access and use.

Specifically, the computer keyboard and template holder includes a platform 12. The platform is formed of a rigid material such as metal, wood or plastic. The platform has a short upstanding rectangular planar front wall 14 having a top edge 16 and a bottom edge 18. The platform also has a long upstanding rectangular planar back wall 20 with a top edge 22 and a bottom edge 24. A long generally rectangular generally horizontal bottom plate 26 interconnects the front wall with the back wall at a location near their bottom edges to define a holding space between the walls. The bottom plate has an upper supporting surface 28 extended angularly upwards from the front wall to the back wall. The supporting surface is positioned below the holding space and walls for allowing a computer keyboard 30 to be placed thereon such that the computer keyboard is juxtaposed between the walls. The platform further includes a plurality of feet 32 extended downwards therefrom for supporting the platform on a recipient surface and preventing it from slipping. The present invention also includes generally circular binder rings 40 coupled to the back wall of the platform near the top edge thereof. The rings are positioned in parallel and axially aligned. The rings are openable for receiving computer templates or the like therein and closable for securing the computer templates to the platform. In the preferred embodiment, three binder rings are used.

To hold computer templates, a plurality of sleeves 50 are provided. Each sleeve is generally rectangular in structure and formed of a transparent plastic material. The sleeves are coupleable to the binder rings. Each sleeve has a top planar surface interconnected with a bottom planar surface to thus create a space therebetween for holding a computer template 52. Each sleeve further includes a front long edge 54, a rear long edge 56, and opposed short side edges 58 interconnecting the long edges. In the preferred embodiment, three spaced and aligned holes 60 are disposed through the sleeve at a location near the rear long edge. The holes are removably mated with the binder clips to thereby secure a sleeve to the platform. Each sleeve additionally includes an integral and generally rectangular tab 62 coplanarly projected from one side edge thereof. The sleeves in combination are slidably positionable in a registered superposed relation upon the top edge of the back wall such that their tabs are offset in a general stair-step like sequence and readily accessible for use.

Also provided with the present invention is an elongated arm 70. The arm is formed of a rigid material such as metal or plastic. The arm has a lower first end 72 pivotally coupled to one side edge of the platform with a spring-loaded adjustable ball joint 74. The ball joint is mateable within a plurality of hemispheric slots 76 disposed within a bore formed on the side edge that is sized to accommodate the first end. The arm also includes an upper second end 78 projected upwards to a location above and offset from the platform. A first intermediate bend location 80 is defined between the first end and second end. A second intermediate bend location 82 is defined between the first intermediate location and second end. A first segment 84 is extended outwards from the first end to the first intermediate location. A second segment 86 is extended upwards from the first intermediate location to the second intermediate location. Lastly, a third segment 88 is extended outwards from the second intermediate location to the second end. The second end is terminated at an openable clamp 90. This clamp is biased with a spring 92 for removably holding working papers.

The present invention is used for holding plastic computer function key templates that typically come with computer software. The present invention makes these templates easier to keep track of and use. The present invention consists of a generally rectangular platform having a holding space or recess on which to place the keyboard. The platform is 16 inches long as measured between its side edges and 9 inches wide as measured between its front wall and rear wall. The front wall is 1 inch in height and the back wall is approximately 2½ inches in height. The bottom plate is coupled between the front and back wall such that it forms a holding space or recess having a depth of about ½ inch as measured from the top edge of the front wall. The raised back wall has a narrow strip or edge along its top extent on which are mounted three evenly spaced metal or plastic rings for holding the templates or sleeves. In addition, an aluminum arm is included. This arm is hinged and angled upward from the platform and terminated with a paper clamp. This arm snaps or clamps to the platform. The other main component is the plastic sleeves used for holding templates. Computer templates may be disposed in the sleeves for use. Each sleeve includes a tab projected therefrom that allows each template to be readily accessed.

To operate the present invention, a computer keyboard is placed upon the platform. Computer templates are then inserted into each sleeve and attached to the rings on the back wall. The sleeves may then be flipped until the desired template is accessed for use. The sleeves rest conveniently on the top edge of the back wall right above the function keys of a computer keyboard. The clamp on the arm is used for holding working papers while typing. The present invention thus precludes computer templates from being lost or torn. The present invention also organizes templates and working papers and allows them to be readily accessed for use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassedby the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A computer keyboard and template holder for holding a computer keyboard and associated templates and working papers in a convenient location for use with a computer comprising, in combination:

a rigid platform having a short upstanding rectangular planar front wall with a top edge and a bottom edge, a long upstanding rectangular planar back wall with a top edge and a bottom edge, and a long generally rectangular bottom plate interconnecting the front wall with the back wall near their bottom edges to define a holding space therebetween and with the bottom plate having an angled supporting surface located below the holding space sized for allowing a computer keyboard to be placed thereon such that the computer keyboard is juxtaposed between the walls;

three spaced parallel axially aligned openable rigid binder rings coupled to the back wall of the platform near the top edge thereof;

a plurality of transparent plastic rectangular sleeves coupled to the binder rings, each sleeve having a top planar surface interconnected with a bottom planar surface to create a space therebetween for holding a computer template, each sleeve further having a front long edge, a rear long edge, opposed short side edges interconnecting the long edges, and three spaced aligned holes disposed therethrough near the rear long edge thereof removably mated with the binder rings, each sleeve additionally having an integral and generally rectangular tab coplanarly projected from one side edge thereof, the sleeves in combination slidably positionable in a registered superposed relation upon the top edge of the back wall such that their tabs are offset and readily accessible; and an elongated rigid arm having a lower first end pivotally coupled to one side edge of the platform and an upper second end perpendicular to the first end projected upwards to a location above and offset from the platform and terminated at an openable clamp with a spring for removably holding working papers.

\* \* \* \* \*